United States Patent
Masaki et al.

(10) Patent No.: US 6,271,907 B1
(45) Date of Patent: Aug. 7, 2001

(54) COLOR LIQUID CRYSTAL DEVICE HAVING INJECTION PORT PARALLEL TO THE STRIPE ELECTRODES ON THE SUBSTRATE WITH COLOR FILTER AND FLATTENING FILM AND THE OTHER SUBSTRATE FREE FROM COLOR FILTER AND FLATTENING FILM PROTRUDED

(75) Inventors: Yuichi Masaki, Kawasaki; Masaaki Suzuki, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/169,974

(22) Filed: Oct. 13, 1998

(30) Foreign Application Priority Data

Sep. 14, 1997 (JP) .................................................. 9-280264

(51) Int. Cl.$^7$ ...................... G02F 1/1341; G02F 1/1347; G02F 1/1339
(52) U.S. Cl. ............................ 349/189; 349/76; 349/153; 349/190
(58) Field of Search .............................. 349/76, 100, 153, 349/189, 190

(56) References Cited

U.S. PATENT DOCUMENTS

| | | | |
|---|---|---|---|
| 4,367,924 | 1/1983 | Clark et al. | 350/334 |
| 4,569,574 | 2/1986 | Masaki et al. | 350/334 |
| 4,591,240 | 5/1986 | Masaki et al. | 350/339 R |
| 4,636,817 | 1/1987 | Masaki | 346/160 |
| 5,285,300 | 2/1994 | Suzuki et al. | 359/54 |
| 5,381,255 | 1/1995 | Ohnuma et al. | 359/68 |
| 5,406,398 * | 4/1995 | Suzuki et al. | 359/80 |
| 5,548,428 * | 8/1996 | Masaki et al. | 359/80 |
| 5,684,556 * | 11/1997 | Shimamune | 349/158 |
| 5,699,138 * | 12/1997 | Watanabe et al. | 349/189 |
| 5,751,391 * | 5/1998 | Yokoyama et al. | 349/153 |
| 5,757,452 | 5/1998 | Masaki et al. | 349/110 |
| 5,777,707 | 7/1998 | Masaki et al. | 349/110 |
| 5,858,482 * | 1/1999 | Ishiwata et al. | 428/1 |
| 5,942,066 * | 8/1999 | Sunaga et al. | 156/102 |

FOREIGN PATENT DOCUMENTS 56-107216   8/1981   (JP) .

OTHER PUBLICATIONS

K. Miyasato et al, "Direct method with triangular waves for measuring spontaneous polarization in ferroelectric liquid crystals," *Japanese Journal of Applied Physics*, vol. 22, No. 10, Oct. 1983: L661–L663.

* cited by examiner

Primary Examiner—Kenneth Parker
Assistant Examiner—Mike Qi
(74) Attorney, Agent, or Firm—Fitzpatrick, Cella, Harper & Scinto (57) ABSTRACT

A color liquid crystal device is constituted by a pair of rectangular substrates disposed opposite to each other to form a cell structure having a liquid crystal injection port, and a liquid crystal injected into the cell structure through the liquid crystal injection port. The pair of rectangular substrates includes a first substrate provided with a color filter and stripe electrodes disposed on the color filter and a second substrate provided with stripe electrodes disposed opposite to and intersecting the stripe electrodes on the first substrate. On each rectangular substrate, the stripe electrodes are divided into two groups which are electrically connected to external drive circuits disposed along one and the other, respectively, of mutually opposite sides of the rectangular substrate. The liquid crystal injection port is disposed at one of mutually opposite sides parallel to the stripe electrodes on the first substrate.

5 Claims, 8 Drawing Sheets

COLOR LIQUID CRYSTAL DEVICE HAVING INJECTION PORT PARALLEL TO THE STRIPE ELECTRODES ON THE SUBSTRATE WITH COLOR FILTER AND FLATTENING FILM AND THE OTHER SUBSTRATE FREE FROM COLOR FILTER AND FLATTENING FILM PROTRUDED

FIELD OF THE INVENTION AND RELATED ART

The present invention relates to a color liquid crystal device for use in a display apparatus etc.

With an increasing size of display images, a liquid crystal display apparatus capable of lightening an apparatus weight has attracted notice. In recent years, there has been extensively studied principally a TV image displaying method by using an active matrix-type liquid crystal device wherein a nematic liquid crystal is directly driven by providing each pixel with a switching element. Further, there has been required a high density (resolution) display (of XGA (extended graphics array)-mode or SXGA (super extended graphics array)-mode) represented by, e.g., a display monitor for a personal computer.

On the other hand, a liquid crystal device of the type which controls transmission of light in combination with a polarizing device by utilizing a refractive index anisotropy of chiral smectic (ferroelectric) liquid crystal molecules, has been proposed by Clark and Lagerwall (Japanese Laid-Open Patent Application (JP-A) 56-107216, U.S. Pat. No. 4,367, 924). The chiral smectic liquid crystal generally has chiral smectic C phase (SmC*) or H phase (SmH*) in a specific temperature range and, in the phase, shows a property of assuming either one of a first optically stable state and a second optically stable state in response to an electric field applied thereto and maintaining such a state in the absence of an electric field, namely bistability, and also have a very quick response speed. Accordingly, the chiral smectic liquid crystal is expected to be applied to a display device of a high speed and a memory-type, particularly a display device of a high resolution and a large picture area driven by a simple matrix-driving scheme, thus allowing a higher duty ratio of at most 1/3000 which is impossible for the nematic liquid crystal.

Figure 14A:
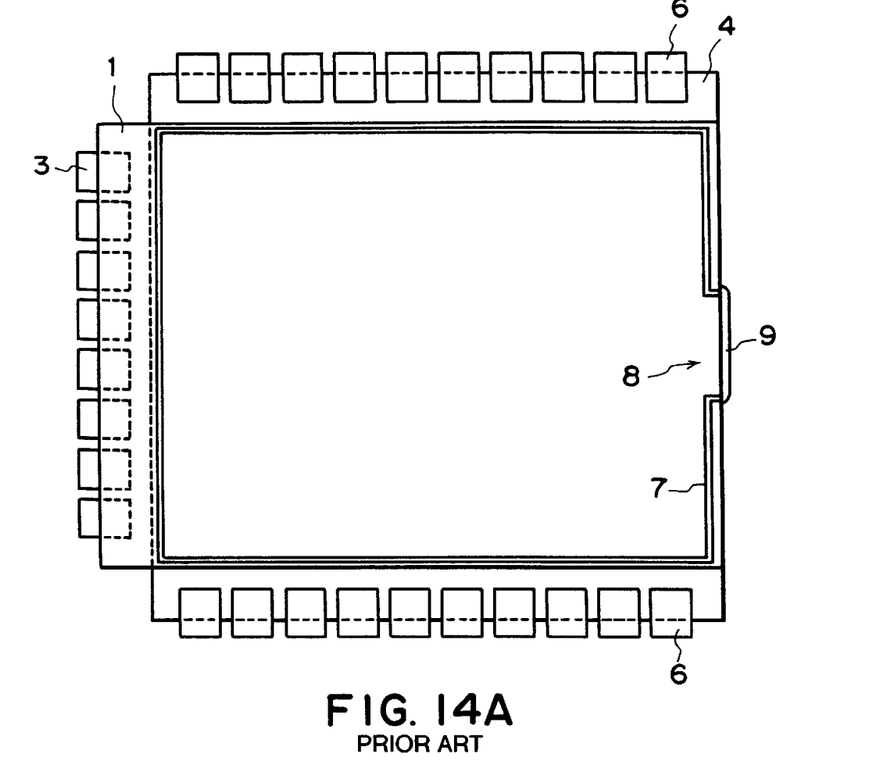
FIG. 14A is a schematic plan view of a conventional (color) liquid crystal device and FIG. 14B is a corresponding sectional view thereof.
Figure 14B:
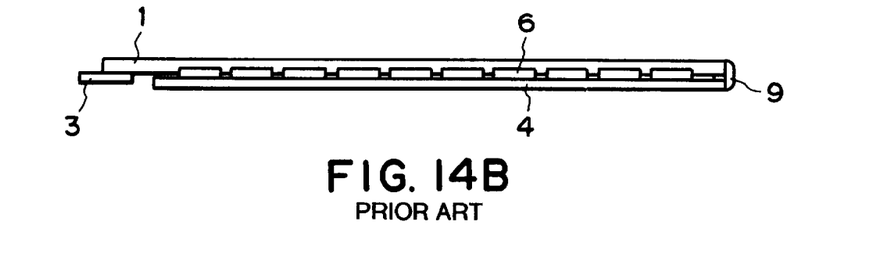

FIG. 14A is a schematic plan view of a conventional liquid crystal device driven by a simple matrix-driving scheme, and FIG. 14B is a schematic sectional view thereof.

Referring to the figures, the liquid crystal device include a substrate 1 provided with a group of scanning electrodes formed in a stripe shape (not shown) (herein, such a substrate 1 is referred to as "scanning-side substrate"). The group of scanning electrodes are electrically connected to driver ICs (integrated circuits) as external drive circuits (not shown) each provided with a TAB (tape automated bonding) film 3. The liquid crystal device also includes a substrate 2 provided with a group of data electrodes formed in a stripe shape (not shown) (herein, such a substrate 4 is referred to as "data-side substrate"). The group of data electrodes intersect the group of scanning electrodes at right angles and are electrically connected to driver ICs as external drive circuits (not shown) each provided with a TAB film 3 at mutually opposite sides (in which the data electrodes are divided) of the data-side substrate 4 in an extension (longitudinal) direction of the data electrodes.

The (scanning-side and data-side) substrates 1 and 4 are applied to each other at the periphery thereof via a sealing agent 7 formed in a prescribed pattern so as to leave a liquid crystal injection port 8 which is sealed up with a injection port sealing material 9 after a liquid crystal injection.

In the conventional simple matrix-type liquid crystal device, a smaller number of the scanning electrodes are electrically connected to the external drive circuits at one of mutually opposite sides of the scanning-side substrate in the extension direction of the scanning electrodes. On the other hand, the data electrodes on the data-side substrate are electrically connected to the external drive circuits at the opposite sides (in the data electrode extension direction) between which the data electrodes are alternately apportioned for electrical connection.

In such a conventional liquid crystal device, the liquid crystal injection port has been provided at a side opposite to the side where the scanning electrodes are electrically connected with the external drive circuits, i.e., a side free from electrical connection with the external drive circuits.

However, when a (ultra-) higher resolution color display of a level of 300 dpi (300 pixels per 1 inch) is required, a larger picture area (e.g., of 15 in.-size) includes a large number of scanning and data electrodes each for exceeding 5000 lines. In this instance, in view of a connection pitch with the external drive circuits at the opposite two sides (in the electrode extension direction) for both the scanning-side substrate and the data-side substrate. When the external drive circuits are electrically connected with corresponding scanning electrodes or data electrodes, the substrate to be subjected to external electrical connection is required to be disposed so as to be protruded (outward) from the other substrate end (edge) as shown in FIG. 1.

Figure 1:
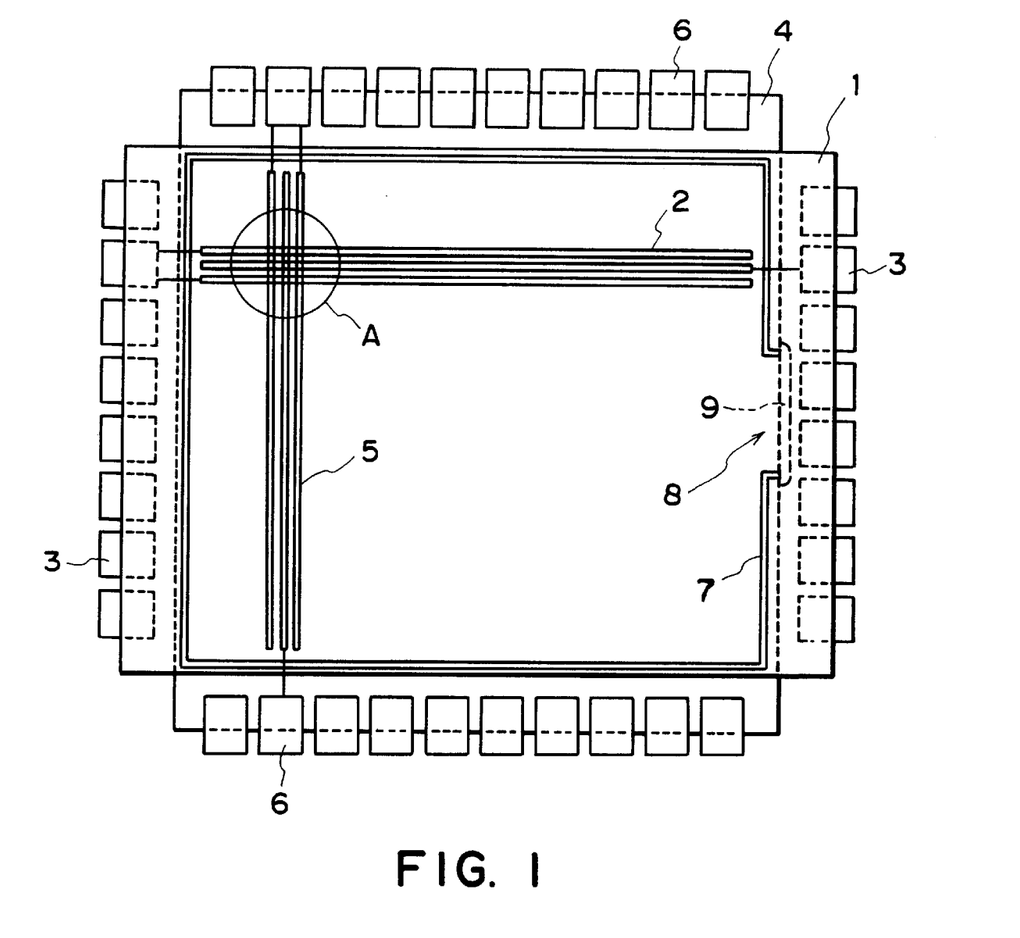
FIG. 1 is a schematic plan view of an embodiment of the liquid crystal device according to the present invention.

Referring to FIG. 1, (stripe) scanning electrodes 2 and (stripe) data electrodes 5 are required to be extended to corresponding side portions in electrode extension directions, respectively, in order to effect electrical connection with corresponding external drive circuits (TAB films 3 and 6).

For each substrate 1 (or 4), at other opposite two sides, the scanning electrodes 2 (or the data electrodes 5) are not required to be formed in the vicinity of the sides because of no electrical connection with the external drive circuits.

Figure 3:
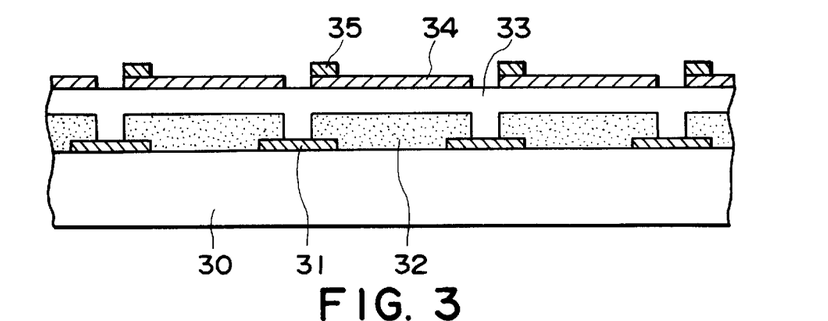
FIG. 3 is a schematic sectional view for illustrating a part of production process of the liquid crystal device of the present invention.

In the case where the above-mentioned electrical connection structure (as shown in FIG. 1) is employed in a color liquid crystal device including a color filter 32 disposed on a substrate 30 and a flattening film 33 (e.g., of a resin) covering the color filter 32 and stripe electrodes 34 (e.g., of ITO (indium tin oxide) film) formed on the flattening film 33 as shown in FIG. 3, at the sides where the stripe electrodes 34 are electrically connected with external drive circuits, the color filter 32 and the flattening film 33 are also extended to the electrically connected side portions.

In such a case, a liquid crystal injection port 8 is also located in the vicinity of one of four electrically connected side portions of a rectangular (color) liquid crystal device as shown in FIG. 1. After the liquid crystal injection is completed, when an excessive liquid crystal portion attached to an inner surface of a (protruded) substrate (the substrate 1 in FIG. 1) is wiped up with a cotton swab impregnated with a wiping solvent for the liquid crystal, the flattening film 33 (as shown in FIG. 3) is removed from the substrate 30 if the substrate 1 (FIG. 1) is provided with the color filter 32 and the flattening film 33 as in the substrate 30 (FIG. 3). As a result a part of the scanning electrodes 2 (FIG. 1) is also removed from the substrate 1, thus causing electrical connection failure (electrode breakage).

SUMMARY OF THE INVENTION

An object of the present invention is to provide a color liquid crystal device of a high reliability, a high resolution (definition) and a large picture area and free from a problem of electrode breakage while keeping a mass-productive liquid crystal injection scheme with respect to a rectangular cell structure to be electrically connected with external drive circuits at all the four sides thereof.

Another object of the present invention is to provide a process for producing the color liquid crystal device.

According to the present invention, there is provided a color liquid crystal device, comprising: a pair of rectangular substrates disposed opposite to each other to form a cell structure having a liquid crystal injection port, and a liquid crystal injected into the cell structure through the liquid crystal injection port, the pair of rectangular substrates including a first substrate provided with a color filter and stripe electrodes disposed on the color filter and a second substrate provided with stripe electrodes disposed opposite to and intersecting the stripe electrodes on the first substrate, wherein on each rectangular substrate, the stripe electrodes are divided into two groups which are electrically connected to external drive circuits disposed along one and the other, respectively, of mutually opposite sides of the rectangular substrate, and the liquid crystal injection port is disposed at one of mutually opposite sides parallel to the stripe electrodes on the first substrate.

According to the present invention, there is also provided a process for producing a color liquid crystal device comprising the steps of:

providing a rectangular first substrate with a color filter and stripe electrodes disposed on the color filter, providing rectangular second substrate with stripe electrodes, applying the first and second substrates to each other with a gap therebetween via a sealing agent disposed at a periphery of the substrates while leaving a liquid crystal injection port at an elongated side portion of the first substrate parallel to the electrodes thereon, injecting a liquid crystal through a liquid crystal injection port, cutting the side portion of the first substrate in parallel with a side closer to the injection port so as to expose a corresponding side portion of the second substrate where an excessive liquid crystal is attached in the vicinity of the injection port, wiping up the excessive liquid crystal from the corresponding side portion of the second substrate, sealing up the injection portion with an injection port sealing agent, and electrically connecting each of the stripe electrodes of the first and second substrates to a corresponding external drive circuit at a side perpendicular to each corresponding stripe electrode while, on each rectangular substrate, dividing the stripe electrodes into two groups which are electrically connected at one and the other, respectively, of mutually opposite sides of the rectangular substrate.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

FIG. 1 is a schematic plan view of an embodiment of the color liquid crystal device according to the present invention.

Referring to FIG. 1, the color liquid crystal device includes a scanning-side substrate 1, stripe scanning electrodes 2 disposed on the substrate 1, TAB films 3 each provided with an IC chip and electrically connected to the scanning electrodes 2, a data-side substrate 4, stripe data electrodes 5 disposed on the substrate 4, TAB films 6 each provided with an IC chip and electrically connected to the data electrodes 5, a sealing agent 7, a liquid crystal injection port 8 and an injection port sealing material (agent) 9.

Figure 2:
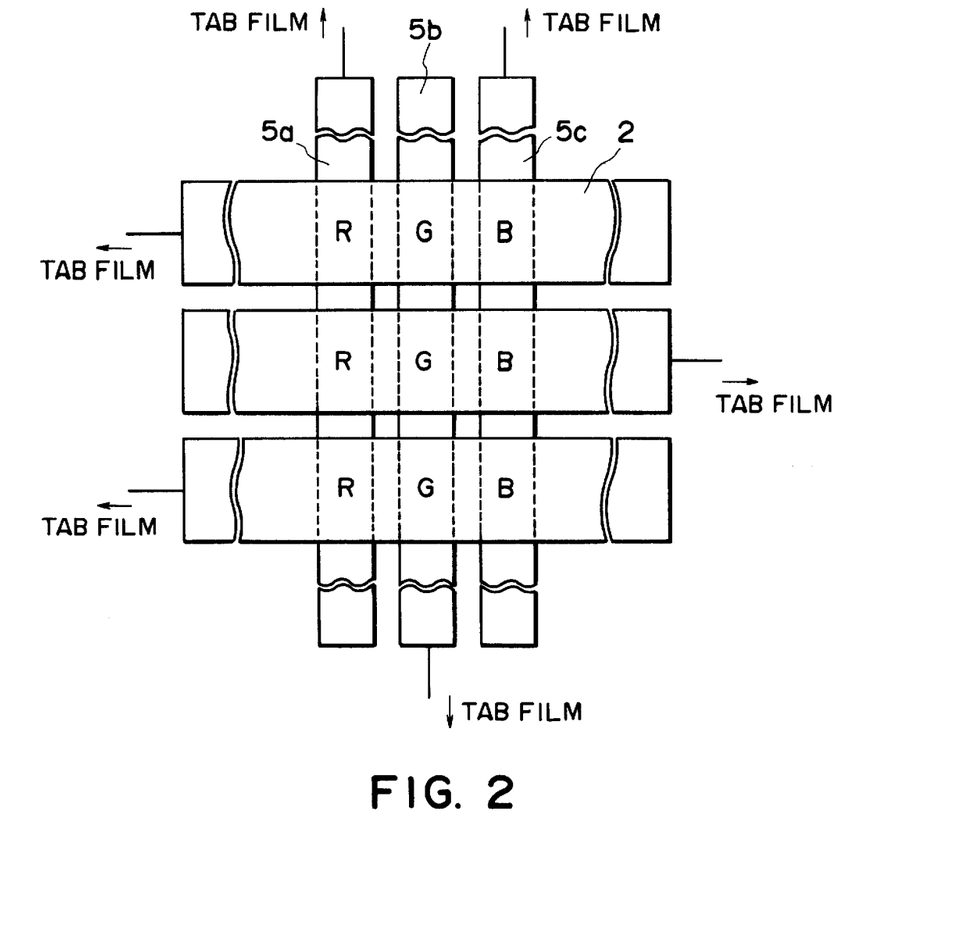
FIG. 2 is a schematic (enlarged) plan view of an electrode structure of an embodiment of the liquid crystal device of the present invention.

The scanning electrodes 2 and data electrodes 5 in intersect each other at right angles. In respective longitudinal (extension) directions of the scanning electrodes 2 and the data electrodes 5, one of the scanning-side substrate 1 and the data-side substrate 4 is protruded from the other substrate at opposite two sides perpendicular to the corresponding electrode longitudinal direction (of the scanning electrodes 2 or the data electrodes 5). At the mutually opposite sides for each of the scanning-side substrate 1 and the data-side substrate 4, the respective stripe electrodes (the scanning electrodes 2 or the data electrodes 5) are alternately electrically connected to corresponding IC chips provided to corresponding TAB films (3 or 6) respectively, i.e., adjacent two electrodes are electrically connected thereto on one side (of the opposite sides) and the other side, respectively (as shown in FIG. 2). Further, the data-side substrate 4 provided with the liquid crystal injection port 8 at one side not protruded for connection with the TAB films 6 is provided with a plurality of color filters of red (R), green (G) and blue (B) (not shown).

FIG. 2 is an enlarged view of a portion A shown in FIG. 1.

Referring to FIG. 2, one pixel is constituted by a set of three color filter segments (R, G and B) formed at each intersection of adjacent three data electrodes 5a, 5b and 5c and one scanning-electrode 2, thus effecting a full-color display. In FIG. 3, three pixels (three sets of R, G and B) are shown.

Hereinbelow, respective members of the liquid crystal device according to the present invention will be described along production steps of a liquid crystal cell.

FIG. 3 is a schematic sectional view for illustrating a part of preparation steps for the data-side substrate 4 (shown in FIG. 1) provided with the color filters, i.e., provided with the liquid crystal injection port 8 at the side where the TAB films 6 (as the external drive circuits) are not electrically connected with the data electrodes 5.

Referring to FIG. 3, on a transparent substrate 30 of, e.g., glass, a light-interrupting layer (black matrix or black stripe) 31 of a metal (e.g., Cr) is formed with spacings. On such a substrate 30, color filters 32 of R, G and B are formed so as to cover the spacings of the light-interrupting layer 31 and thereon, a flattening film 33 is formed so as to smooth or flatten a resultant surface, thus providing an even (or flat) surface. On the thus-formed even surface of the flattening film 33, data electrodes 34 of an transparent conductive film of ITO (indium-tin-oxide) are formed in a stripe shape and are partially coated with auxiliary electrodes 35 of a metal. As a result, the resultant electrodes are reduced in electrical resistance, thus alleviating or suppressing a propagation delay of a driving waveform when the resultant liquid crystal device is driven.

Then, the thus formed data electrodes 34 partially provided with the metal electrodes 35 are subjected to inspection or check whether adjacent electrodes cause short circuit or not. For inspection, as shown in FIG. 4, a probe 41 of a metal (e.g., tungsten) is placed on an exposed check portion 42 at an end portion of each electrode where a rectangular-shaped ITO film portion 34 is exposed and not coated with the metal electrode 35 in the vicinity of the external connection portion with the IC chip.

Figure 4:
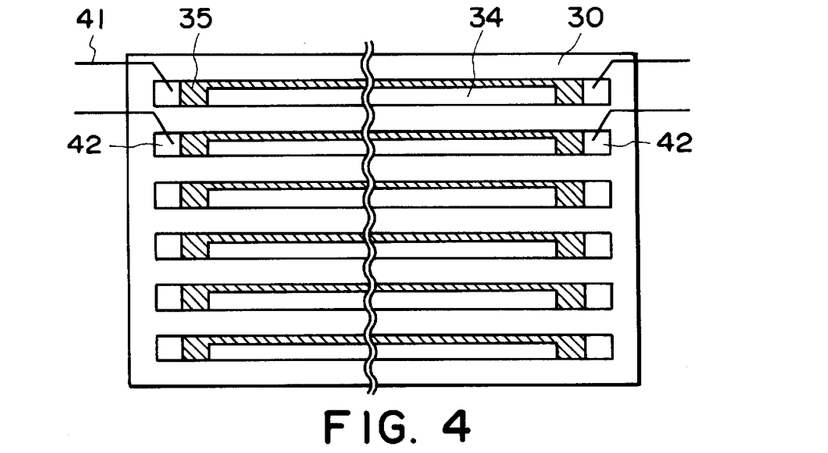
FIG. 4 is a schematic plan view for illustrating a short-circuit inspection of electrodes in the liquid crystal device of the present invention.

By providing each data electrode (ITO film) 34 with the exposed check portions 42 at both end portions thereof as shown in FIG. 4, it is possible to prevent an occurrence of a short circuit between adjacent electrodes due to slippage of the probe at the time of seeking the exposed check portion.

After the inspection of the short circuit, on the data electrodes, a short circuit-prevention film, an insulating film and an alignment control film are successively formed to prepare a data-side substrate.

On the other hand, a scanning-side substrate is prepared in the same manner as in the above-described data-side substrate except that the light-interrupting layer 31, the color filters 32 and the flattening film 33 ar not formed, i.e., scanning electrodes are formed directly on a transparent substrate.

The thus prepared scanning-side substrate and data-side substrate are oppositely disposed each other so as to form a matrix electrode structure between the scanning electrodes and the data electrodes and are applied to each other via a spacer (e.g., silica beads) with a sealing agent disposed on the periphery of at least one of the scanning-side and data-side substrates while leaving a liquid crystal injection port. Specifically, e.g., as shown in FIG. 1, the sealing agent 7 is formed on the data-side substrate 4 in a rectangular shape while leaving the liquid crystal injection port 8 at one side thereof in parallel with the data electrodes 5 (i.e., perpendicular to the scanning electrodes 2).

Figure 5:
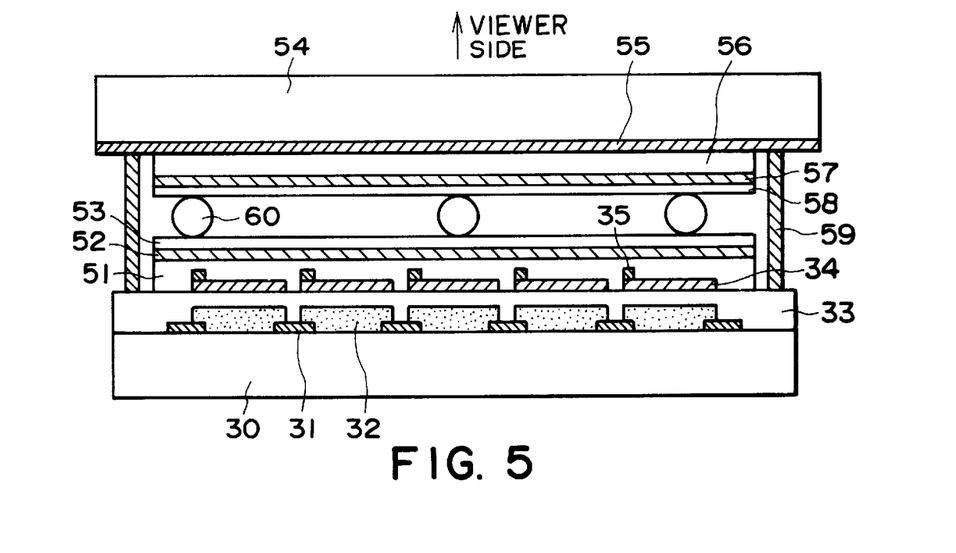
FIG. 5 is a schematic sectional view of an embodiment of the liquid crystal device of the present invention before a liquid crystal injection.

FIG. 5 shows an embodiment of the thus prepared (blank) cell structure before a liquid crystal injection.

Referring to FIG. 5, the cell structure includes: a pair of substrates 30 and 54 a light-interrupting layer 31, color filters 32 (of R, G and B), a flattening film 33, data electrodes 34, metal (auxiliary) electrodes 35, scanning electrodes 55, short circuit-prevention layers 51 and 56, insulating films 52 and 57, alignment control films 53 and 58, a sealing agent 59, and a spacer 60. On the scanning electrodes 55, metal electrodes (not shown) are disposed similarly as in the data electrodes 34.

In the present invention, as shown in FIG. 5, the data-side substrate 54 may preferably be disposed on a viewer side.

Then, a liquid crystal injection step in the present invention will be described with reference to FIGS. 6–12 wherein reference numerals identical to those used in FIG. 1 represent identical members, respectively.

Figure 6A:
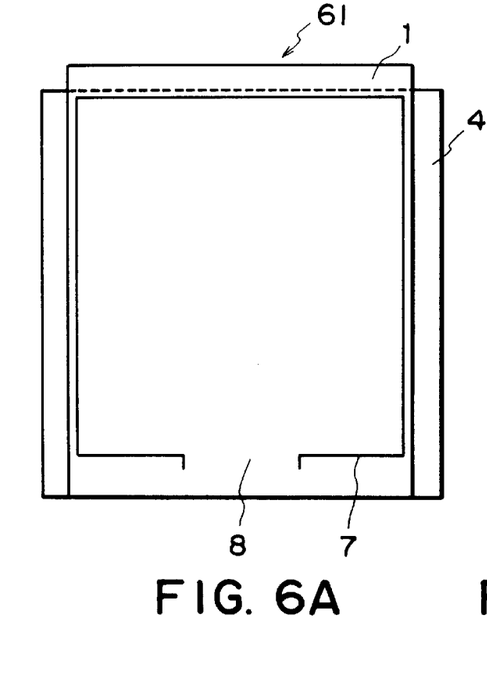
FIG. 6A is a schematic plan view of an embodiment of the liquid crystal device of the present invention before the liquid crystal injection and FIG. 6B is a corresponding sectional view thereof.
Figure 6B:
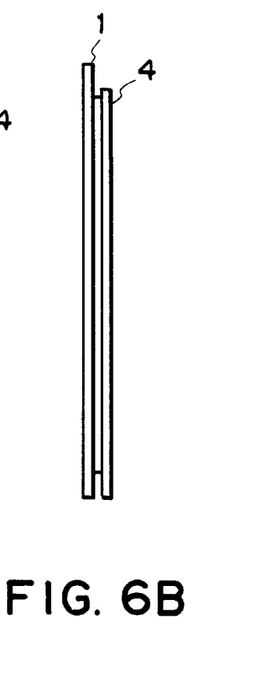

FIG. 6A is a schematic plan view of a liquid crystal cell before a liquid crystal injection and FIG. 6B is a corresponding sectional view thereof.

At a lower side of a liquid crystal cell 61 provided with the liquid crystal injection port 8, edges (end portions) of the scanning-side substrate 1 and the data-side substrate 4 are in alignment with each other before the liquid crystal injection.

Figure 7:
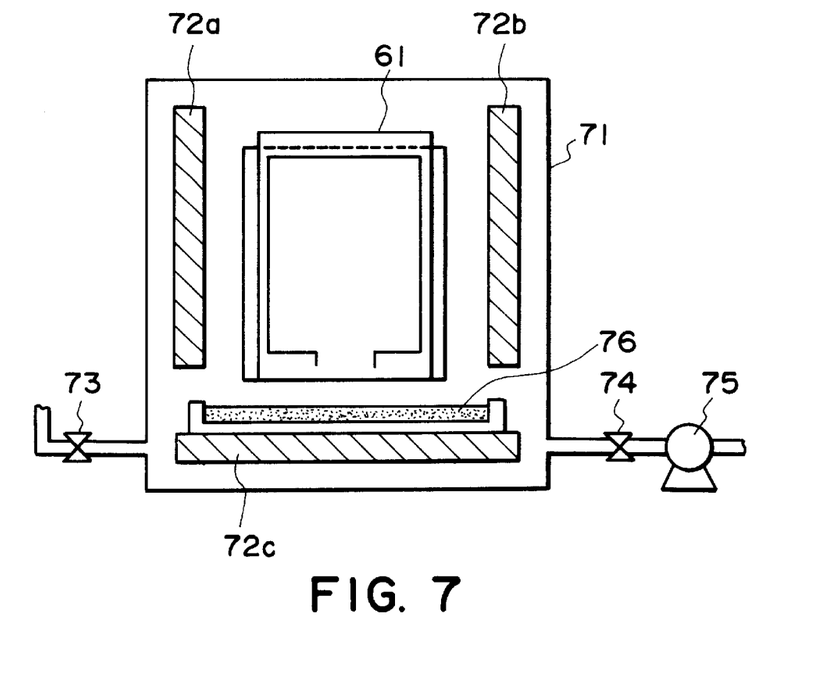
FIGS. 7–9 are schematic plan views for illustrating a sequential step of the liquid crystal injection in the production process of a color liquid crystal device according to the present invention.
Figure 8:
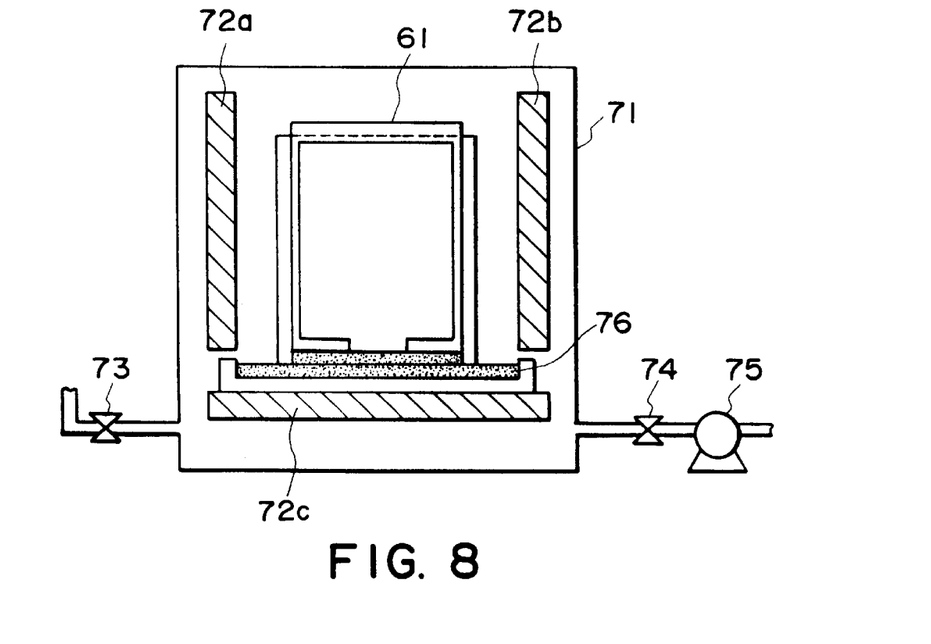
Figure 9:
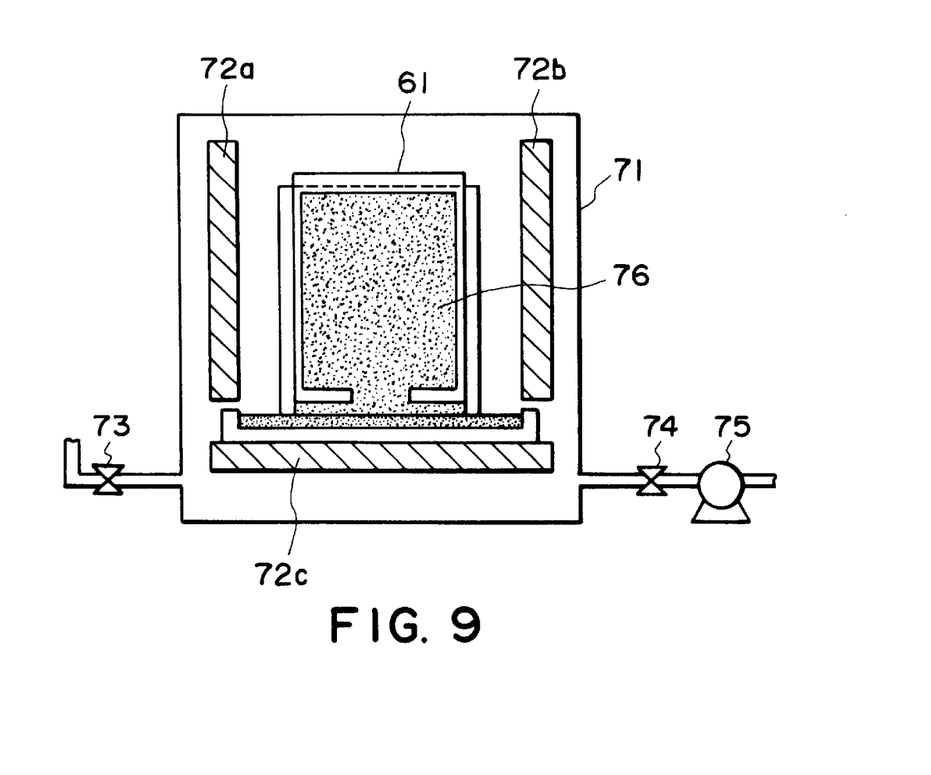

Specific liquid crystal injection steps are shown in FIGS. 7–9 wherein the liquid crystal cell 61 is set within a liquid crystal injection chamber 71 provided with heaters 72a, 72b and 72c, a pressurizing valve 73, a pressure reducing valve 74, a vacuum pump 75, and a liquid crystal 76 to be filled in the liquid crystal cell 61.

Figure 13:
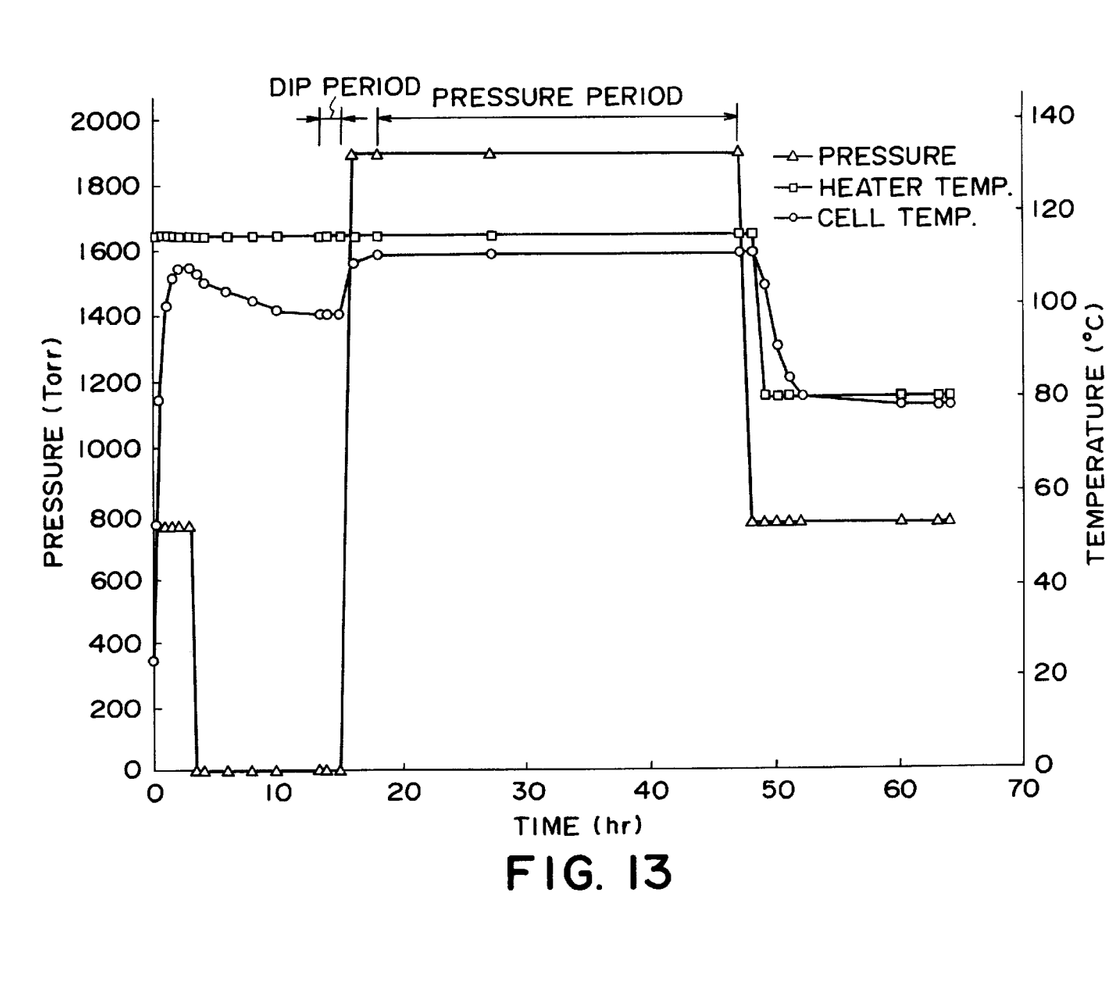
FIG. 13 is a graph showing a program for temperature, pressure and treating time employed in a liquid crystal injection step of Example 1 appearing hereinafter.

More specifically, the liquid crystal cell 61 set within the chamber 71 is heated by the heaters 72a and 72b while heating a liquid crystal vessel containing the liquid crystal 76. Then, the pressurizing valve 73 is closed and the pressure reducing valve 74 is opened to effect internal evacuation of the chamber 71 by means of the vacuum pump 75 (FIG. 7). Thereafter the liquid crystal injection port of the cell 61 is immersed in the liquid crystal 76 (FIG. 8), followed by injection of the liquid crystal 76 into the cell 61 (FIG. 9) in accordance with a prescribed injection program (including controlled pressure and temperature) (e.g., as shown in FIG. 13).

Figure 10:
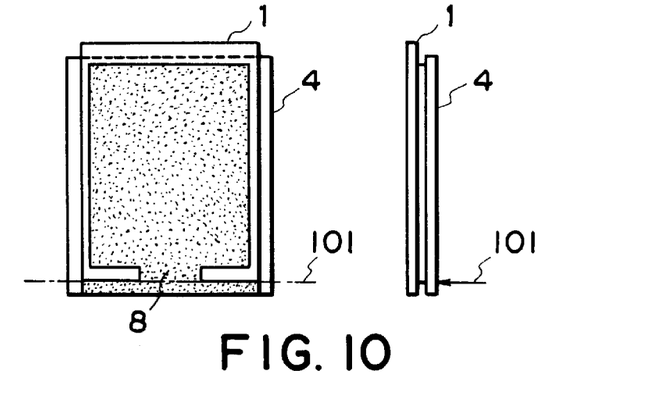
FIGS. 10A, 11A and 12A are schematic plan views for illustrating a sequential step of sealing a liquid crystal injection port in the liquid crystal production process of the present invention.
FIGS. 10B, 11B and 12B are corresponding sectional views of FIGS. 10A, 11A and 12B, respectively.
Figure 11:
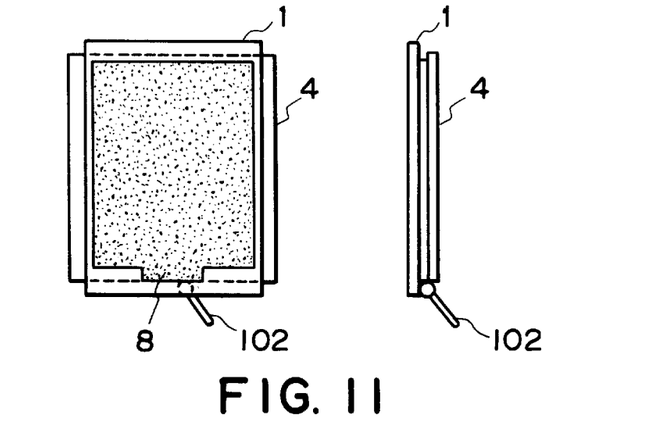
Figure 12A:
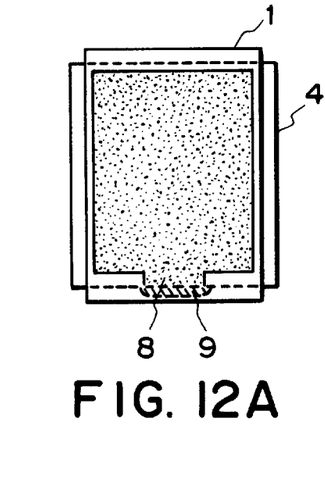
Figure 12B:
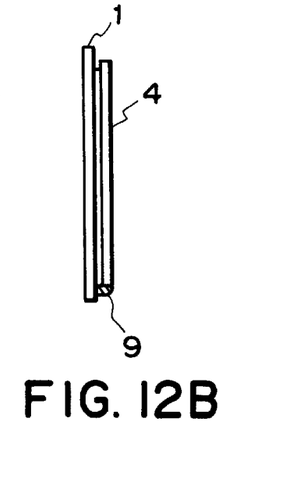

After the liquid crystal injection, the liquid crystal injection port 8 is sealed up as shown in FIGS. 10–12.

Specifically, the data-side substrate 4 is cut off along a scribing line 101 (as show in FIGS. 10A and 10B) to expose and protrude an end portion (lower side in the figures) of the scanning-side substrate 1, thus exposing the scanning electrodes thereat which scanning electrodes can be electrically connected with TAB films (as external drive circuits). Thereafter, a portion of the liquid crystal attached to the exposed end portion of the scanning-side substrate 1 is wiped off with a cotton swab 102 optionally impregnated with a prescribed (wiping) solvent (as shown in FIGS. 11A and 11B).

In this embodiment, the color filters are formed on the data-side substrate 4 having no protrusion portion at a side where the liquid crystal injection port 8 is located, so that the flattening film and/or color filters are not removed by the wiping operation and the optional wiping solvent.

After the wiping operation, the liquid crystal injection port 8 is sealed up with an injection port sealing agent 9 (as shown in FIGS. 12A and 12B), thus preparing a color liquid crystal cell (device).

In this embodiment, the color filters (and light-interrupting layer and flattening film) are formed on the data-side substrate 4 but may be formed on the other (scanning-side) substrate 1. In this case, the scanning-side substrate 1 is cut off in the vicinity of the liquid crystal injection port 8 for electrical connection thereat between the data electrodes and TAB films on the data-side substrate 4.

In the present invention, other members for the liquid crystal device may appropriately be formed of known materials and arranged in known manners.

Hereinbelow, the present invention will be described more specifically based on examples.

EXAMPLE 1

A color liquid crystal device (14 in.-sized, 3200×2400 pixels (quad UXGA (ultra extended graphics array) mode), pixel pitch=90 $\mu$m) having a structure as shown in FIGS. 1, 3 and 5 was prepared.

1.1 mm-thick surface-polished glass substrate 30 (300× 340 mm) was coated with a 1000 Å-thick light-interrupting layer (black stripe) 31 of Cr and thereon, a 1.5 $\mu$m-thick color filter pattern 32 of R (red), G (green) and B (blue) as formed (as shown in FIGS. 3 and 5).

On the color filter pattern 32, in order to decrease an unevenness of the color filters 32 to at most 500 Å, a coating liquid for a flattening film 33 ("PSB", mfd. by Toray K.K.; phenyl siloxane-based material, pencil hardness=4 B, heat-resistant temperature 350° C.) was applied by spin coating and hot-baked at 250° C. for 60 min. in an oven to form a 1.5 $\mu$m-thick (maximum thickness) flattening film 33.

A 1000 Å-thick ITO film was formed on the flattening film 33 by sputtering and then formed in a prescribed pattern corresponding to the color filter pattern 32 through a photolithographic process to form 9600 (3200×3 (R, G, B) data electrode lines (stripe electrodes) 34.

The data electrode lines 34 is partially coated with three layer-type metal electrodes 35 each consisting of a 400 Å-thick Mo-Ta layer, a 1200 Å-thick Al-Si-Cu layer and a 400 Å-thick Mo-Ta layer by sputtering, followed by patterning so that each metal electrode 35 was in alignment with the corresponding data electrode line 34 while leaving opposite two end portions as exposed check portions for short circuit inspection as shown in FIG. 4.

When the short circuit inspection was performed with a tungsten probe 41, no short circuit portions were detected between every adjacent two data electrode lines.

On a 1.1 mm-thick surface-polished glass substrate 54 (as shown in FIG. 5) identical to the glass substrate 30, 2400 scanning electrode lines (stripe electrodes) 55 each provided with three layer-type metal electrodes were formed in the same manner as in the data electrode lines 34 and metal electrodes 35.

Then, on each of the thus prepared substrate 30 and 54, a 1000 Å-thick short circuit-prevention layer (51 or 56) of TaO$_x$ film was formed by sputtering with a masking member disposed at the periphery of the substrates.

On the short circuit-prevention layer (51 or 56), a 200 Å-thick (after drying) insulating film (52 or 57) was formed with a printing material ("PAM-606J", mfd. by Shokubai Kasei Kogyo K.K.) by flexography, followed by hot-baking at 250° C. for 60 min.

On the insulating film (52 or 57), a coating liquid ("LQ-1800", mfd. by Hitachi kasei Kogyo K.K.) was applied and hot-baked at 270° C. for 6 min. to form a 200 Å-thick alignment control film (53 or 58).

Each of the alignment control films 53 and 58 was subjected to rubbing treatment with a rubbing roller (about which a rayon cloth was wound) so as to provide a pretilt angle $\alpha$ (an angle formed between a longer axis direction of liquid crystal molecules and the alignment control film surface) of 20 degrees under conditions (pressing depth=0.5 mm, rotation speed=700 rpm).

The thus prepared pair of scanning-side and data-side substrates 54 and 30 was washed with pure water and dried.

On the data-side substrate 30, a sealing agent 7 (59 in FIG. 5) ("Struct Bond", mfd. by Mitsui Toatsu K.K.) was disposed at the periphery thereof in a rectangular (frame-shaped) pattern so as to leave a liquid crystal injection port 8 shown in FIG. 1, and 1.2 $\mu$m-dia. SiO$_2$ spacer beads 60 ("Silica Microbeads", mfd. by Shokubai Kasei Kogyo K.K.) were dispersed at a density of 300 (particles)/mm$^2$.

Then, the scanning-side substrate 54 and the data-side substrate 30 were applied to each other so that rubbing directions of the substrates were parallel and identical to each other and the scanning electrodes 55 and the data electrodes 34 intersect each other to form an electrode matrix under a pressure of 3 kg/cm$^2$ at 170° C. for 4 hours, thus curing the sealing agent 59 (7). The liquid crystal injection port 8 was located on one of mutually opposite (two) side parallel to the data electrodes (stripe-shaped lines) 34 of the data-side substrate 4. In the vicinity of the liquid crystal injection port 8, the (blank) cell was scribed and cut in a shape as shown in FIGS. 6A and 6B by using a carbide wheel cutter (cutting tool).

The thus treated cell 61 was set within a liquid crystal injection chamber 71, and a pyrimidine based chiral smectic liquid crystal material 76 (spontaneous polarization (Ps)=40 nC/cm$^2$) was set in a liquid crystal vessel as shown in FIG. 7.

For liquid crystal injection, heaters 72a–72c were set at ca. 118° C., ca. 118° C. and ca. 100° C., respectively and a pressurizing valve 73 was closed and a pressure reducing valve 74 was closed, followed by internal evacuation of the chamber 71 with a vacuum pump 75.

Thereafter, in accordance with a liquid crystal injection program (including temperature, pressure and time conditions) as shown in FIG. 13, the liquid crystal material 76 was filled in the cell 61.

Specifically, as shown in FIG. 8, in a vacuum environment, the liquid crystal material 76 heated in an isotropic liquid state was reduced in viscosity and reached the injection port by the action of surface tension. Thereafter, the pressure reducing valve was closed and the pressurizing valve was opened to place an external pressure of the cell (a pressure at the outside of the cell) in a pressurized state by supplying nitrogen gas, thus gradually filling the liquid crystal material 76 in the cell 61 in the isotropic liquid state, followed by a gradual reduction to 80° C. (as the panel temperature) and normal pressure to complete the liquid crystal injection program. The liquid crystal cell 61 was then naturally cooled to about 50° C. and was taken out from the chamber 71.

By this injection step of the liquid crystal material, it was possible to realize a smooth liquid crystal injection and a uniform alignment state of liquid crystal molecules based on the rubbing treatment over the entire liquid crystal panel (cell).

Incidentally, in this example, the pretilt angle α and the spontaneous polarization Ps were based on values measured through the following methods, respectively.

Measurement of Pretilt Angle α

The measurement was performed according to the crystal rotation method as described at Jpn. J. Appl. Phys. vol. 19 (1930), No. 10, Short Notes 2013.

More specifically, a cell was filled with a standard liquid crystal mixture for measurement assuming SmA phase in the temperature range of 10–55° C. obtained by mixing 80 wt. % of a ferroelectric liquid crystal ("CS-1014", mfd. by Chisso K.K.) with 20 wt. % of a compound represented by the following formula:

For measurement, the liquid crystal cell provided with an objective alignment control layer was rotated in a plane perpendicular to the pair of substrates and including the aligning treatment axis (rubbing axis) and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

A pretilt angle α was obtained through a simulation wherein a fitting of a spectrum of the intensity of the transmitted light formed by interference was effected with respect to the following theoretical curve (a) and relationship (b):

$$T(\phi) = \cos^2\left[\frac{\pi d}{\lambda}\left(\frac{NeNo\sqrt{N^2(\alpha) - \sin^2\phi}}{N^2(\alpha)} - \sqrt{No^2 - \sin^2\phi} - \frac{Ne^2 - No^2}{N^2(\alpha)}\sin\alpha \cdot \cos\alpha \cdot \sin\phi\right)\right], \text{ and}$$ (a)

$$N(\alpha) \equiv \sqrt{No^2 \cos^2\alpha + Ne^2 \sin^2\alpha}$$ (b), wherein No denotes the refractive index of ordinary ray, Ne denotes the refractive index of extraordinary ray, ø denotes the rotation angle of the cell, T(ø) denotes the intensity of the transmitted light, d denotes the cell thickness, and λ denotes the wavelength of the incident light.

Measurement of Spontaneous Polarization Ps

The spontaneous polarization Ps was measured according to "Direct Method with Triangular Waves for Measuring Spontaneous Polarization in Ferroelectric Liquid Crystal", as described by K. Miyasato et al (Japanese J. Appl. Phys. 22, No. 10, L661 (1983)).

After the injection of the liquid crystal material, the data-side substrate 4 was cut off along a scribing (cutting) line 101 as shown in FIGS. 10A and 10B by a carbide wheel cutter to expose the liquid crystal material attached onto the scanning-side substrate 1.

The liquid crystal material attached onto the scanning-side substrate 1 was sufficiently wiped off with a cotton swab 102 impregnated with a solvent (methyl ethyl ketone (MEK)) as shown in FIGS. 11A and 11B.

Thereafter, the injection port 8 was sealed with a injection port sealing agent 9 of a cold-setting epoxy resin as shown in FIGS. 12A and 12B and left standing at room temperature for about 12 hours, followed by heat treatment at 100° C. for 4 hours and a gradual cooling to room temperature.

Then, for each of the data-side substrate 1 and the scanning-side substrate 4, TAB films 3 (or 6) each provided with an IC chip for driving the stripe electrodes 2 (or 5) were electrically connected to the stripe electrodes 2 (or 5) at both the opposite two protrusion portions (sides) of each substrate 1 (or 4), respectively, as shown in FIG. 1, thus preparing a color liquid crystal device according to the present invention.

More specifically, the electrical connection of the TAB films 6 with the data electrodes 5 on the data-side substrate 4 was performed by using 60 TAB films 6 (in total) divided equally between the opposite two protrusion portions (sides) (i.e., 30 TAB films 6 for each protrusion portion). I this regard, the number of the data electrodes 5 was 9600 (lines) in total (3200×3 (R, G and B)) since each pixel was constituted by adjacent three data electrodes 5a, 5b and 5c for color filters of R, G and B, respectively as shown in FIG. 2. Further, each driver IC chip having an output of 160 bits (9600/60) was provided to each TAB film 6 via a positionally aligned ACF (anisotropic conductive film) by thermo-compression bonding.

At the present stage, the ACFs has a pitch of at least 80 μm, thus failing to ensure necessary spacings therebetween if all the TAB films 6 are disposed only at one of the opposite two protrusion portions. Accordingly, as described above, the TAB films 6 are disposed at both of the opposite two protrusion portions of the data-side substrate 4.

On the other hand, in order to electrically connecting 2400 scanning electrodes 2 with the TAB films 3 each provided with a driver IC chip having an output of 120 bits, it is necessary to employ 20 TAB films 3 in total. Particularly, the driver IC chips for driving the scanning electrodes 2 on the scanning-side substrate 1 are required to have a higher withstand voltage, thus requiring larger TAB films 3 than those for the data-side substrate 4. Further, the length (300 mm) of each protrusion portion (side) of the scanning-side substrate 1 is shorter than that (340 mm) of each protrusion portion of the data-side substrate.

Accordingly, in this example, the 20 TAB films 3 was divided equally between the opposite two protrusion portions (sides) of the scanning-side substrate 1 (i.e., 10 TAB films 3 for each protrusion portion) similarly as in the TAB films 6 for the data-side substrate 4.

The thus-prepared color liquid crystal device was sandwiched between a pair of cross nicol polarizers (which polarizing axes intersected each other at right angles) and behind the device, a backlight unit was disposed (on the lower side opposite to the viewer side in FIG. 5).

When the color liquid crystal device was driven, the device showed good drive performances while providing no line defects on the entire display area. Further, a surface reflection of external light was alleviated due to the arrangement of the (metal) light-interrupting layer (black matrix) 31 on the data-side substrate 30 located away from the viewer side as shown in FIG. 5, thus resulting in a suppression of a mirror phenomenon of external view at the display surface of the device to allow a readily recognizable state of display images.

Comparative Example 1

A color liquid crystal device was prepared and evaluated in the same manner as in Example 1 except that the overlying layers (films) 31 to 35 and 51 to 53 (formed on the data-side substrate 30 in Example 1) were formed on the scanning-side substrate 54 and those 55 to 58 (formed on the scanning-side substrate 54 in Example 1) were formed on the data-side substrate 30, i.e., that the structure of the scanning-side and data-side substrates 54 and 30 were interchanged with each other.

When the liquid crystal device was driven, many line defects were confirmed with respect to about ⅙ of the scanning electrodes 55. As a result of detailed observation of the line defects, the scanning electrodes 55 were found to be damaged or broken at the injection port sealing portion. This may be attributable to partial removal of the flattening layer (formed on the color filters on the scanning side substrate 54) together with the overlying scanning electrodes 55 caused by the wiping operation with the cotton swab for wiping off of the excessive liquid crystal material immediately after the liquid crystal injection operation.

Comparative Example 2

A color liquid crystal device was prepared and evaluated in the same manner as in Comparative Example 1 except that the wiping operation in the vicinity of the liquid crystal injection port was not performed for preventing breakage of the scanning electrodes 55.

When the liquid crystal device was driven, no line defects were observed at an initial stage.

However, when the liquid crystal device and that of Example 1 were left standing in an environment of 60° C. and 90% RH, the liquid crystal device of this comparative example caused a breakage of the liquid crystal sealing portion after 250 hours (from the start of the standing) resulting in a liquid crystal leakage and a disorder of alignment states of the liquid crystal in the vicinity of the liquid crystal injection port due to moisture inclusion thereat was also confirmed.

On the other hand, the liquid crystal device of Example 1 was working normally even after 1000 hours.

The liquid crystal devices of Comparative Examples 1 and 2 included the light-interrupting layer disposed closer to the viewer side, thus causing a larger surface reflection leading to an inferior display state which was not readily recognized.

As described hereinabove, according to the present invention, in a color liquid crystal device provided with external drive circuits including one on the liquid crystal injection port side, it becomes possible to effect a good liquid crystal injection and provide good display performances without causing problems such as breakage (peeling) of the color filters and/or the flattening film leading to breakage of the stripe electrodes and an occurrence of a disordered alignment state (alignment failure). As a result, it is possible to realize a high-definition (resolution) color liquid crystal device based on the arrangement of the external drive circuits on all the four sides (of the device) wherein the data electrodes are electrically connected with the eternal drive circuits at the opposite two protrusion portions of the data-side substrate and the scanning electrodes are electrically connected with the external drive circuits at the other opposite two protrusion portions of the scanning-side substrate.

In the color liquid crystal device of the present invention, the substrate provided with no color filters is disposed on the viewer side (as shown in FIG. 5), thus readily providing clear visible images while suppressing an occurrence of external light reflection at the display surface due to the (metal) black matrix.

Further, in the present invention, each of the stripe electrodes is provided with exposed check portions for short circuit inspection, thus readily and effectively checking an occurrence of short circuit between adjacent electrode lines.

What is claimed is:

1. A color liquid crystal device, comprising: a pair of rectangular substrates disposed opposite to each other to form a cell structure having a liquid crystal injection port, and a liquid crystal injected into the cell structure through the liquid crystal injection port, said pair of rectangular substrates including a first substrate provided with a color filter, a flattening film disposed on the color filter and stripe electrodes disposed on the flattening film and a second substrate provided with stripe electrodes disposed opposite to an intersecting the stripe electrodes on the first substrate, said stripe electrodes on the second substrates disposed without via a color filter or a flattening film, wherein
   on each rectangular substrate, the stripe electrodes are divided into two groups which are electrically connected to external drive circuits disposed along one and the other, respectively, of mutually opposite sides of the rectangular substrate, and
   the liquid crystal injection port is disposed at one of mutually opposite sides parallel to the stripe electrodes on the first substrate so that the second substrate free from color filter and flattening film is protruded out of said one of mutually opposite sides of the first substrate provided with the color filter and the flattening film.

2. A device according to claim 1, wherein the second substrate is disposed on a viewer side.

3. A device according to claim 1, wherein each of the stripe electrodes on the first and second substrates is provided with exposed check portions where a transparent conductive film is exposed at opposite two end portions thereof.

4. A device according to claim 1, wherein the liquid crystal comprises a chiral smectic liquid crystal.

5. A process for producing a color liquid crystal device comprising the steps of:
   providing a rectangular first substrate with a color filter, a flattening film disposed on the color filter and stripe electrodes disposed on the flattening film,
   providing rectangular second substrate with stripe electrodes disposed without via a color filter and a flattening film,
   applying the first and second substrate to each other with a gap there between via a sealing agent disposed at a periphery of the substrates while leaving a liquid crystal injection port at an elongated side portion of the first substrate parallel to the electrodes thereon,
   injecting a liquid crystal through a liquid crystal injection port,
   cutting the side portion of the first substrate in parallel with a side closer to the injection port so that a corresponding side portion of the second substrate, free from color filter and flattening film, where an excessive liquid crystal is attached in the vicinity of the injection port is protruded out of said cut side portion of the first substrate provided with the color filter and the flattening film,
   wiping up the excessive liquid crystal from the corresponding side portion of the second substrate,
   sealing up the injection portion with an injection port sealing agent, and
   electrically connecting each of the stripe electrodes of the first and second substrates to a corresponding external drive circuit at a side perpendicular to each corresponding stripe electrode while, on each rectangular substrate, dividing the stripe electrodes into two groups which are electrically connected at one and the other, respectively, of mutually opposite sides of the rectangular substrate.

* * * * *

UNITED STATES PATENT AND TRADEMARK OFFICE
CERTIFICATE OF CORRECTION

PATENT NO.    : 6,271,907 B1
DATED         : August 7, 2001
INVENTOR(S)   : Yuichi Masaki et al.

It is certified that error appears in the above-identified patent and that said Letters Patent is hereby corrected as shown below:

<u>Title page,</u>
Item [30], Foreign Application Priority Data,
"Sep. 14, 1997" should read -- Oct. 14, 1997 --.

<u>Column 4,</u>
Line 51, "in" should be deleted.

<u>Column 9,</u>
Line 45, " $N(\alpha) \equiv \sqrt{No^{2 \cdot \cos^2 \alpha + Ne^2 \sin^2 \alpha}}$ " should read --
$N(\alpha) \equiv \sqrt{No^2 \cdot \cos^2 \alpha + Ne^2 \cdot \sin^2 \alpha}$ --.

<u>Column 10,</u>
Line 16, "I" should read -- In --;
Line 31, "connecting" should read -- connect --; and
Line 41, "substrate." should read -- substrate 4. --.

Signed and Sealed this

Fourteenth Day of January, 2003

JAMES E. ROGAN
*Director of the United States Patent and Trademark Office*